May 27, 1952     G. L. BETTS     2,598,155
ELECTRIC DATA PROCESSOR
Filed March 26, 1946     5 Sheets-Sheet 1
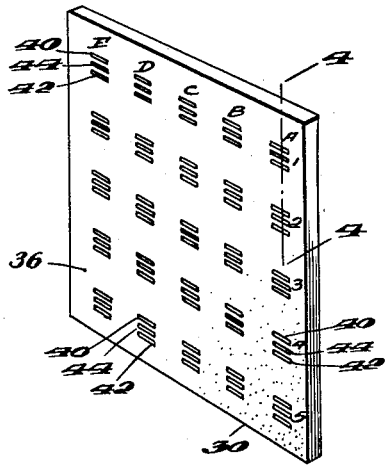
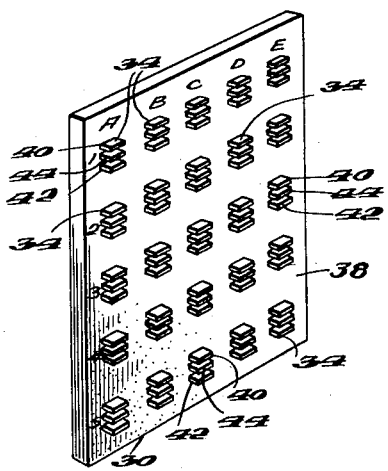
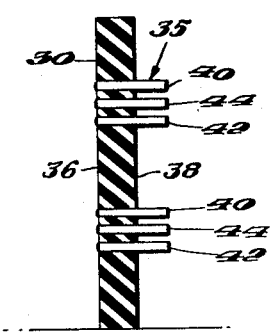
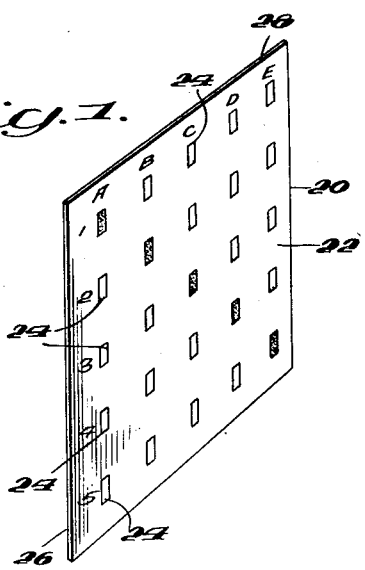
Inventor
GILBERT L. BETTS,
By Ritter, Mechlen & Muir
His Attorneys Inventor
GILBERT L. BETTS,
By Retter, Meehlen & Muir
his Attorneys May 27, 1952 G. L. BETTS 2,598,155
ELECTRIC DATA PROCESSOR
Filed March 26, 1946 5 Sheets-Sheet 3
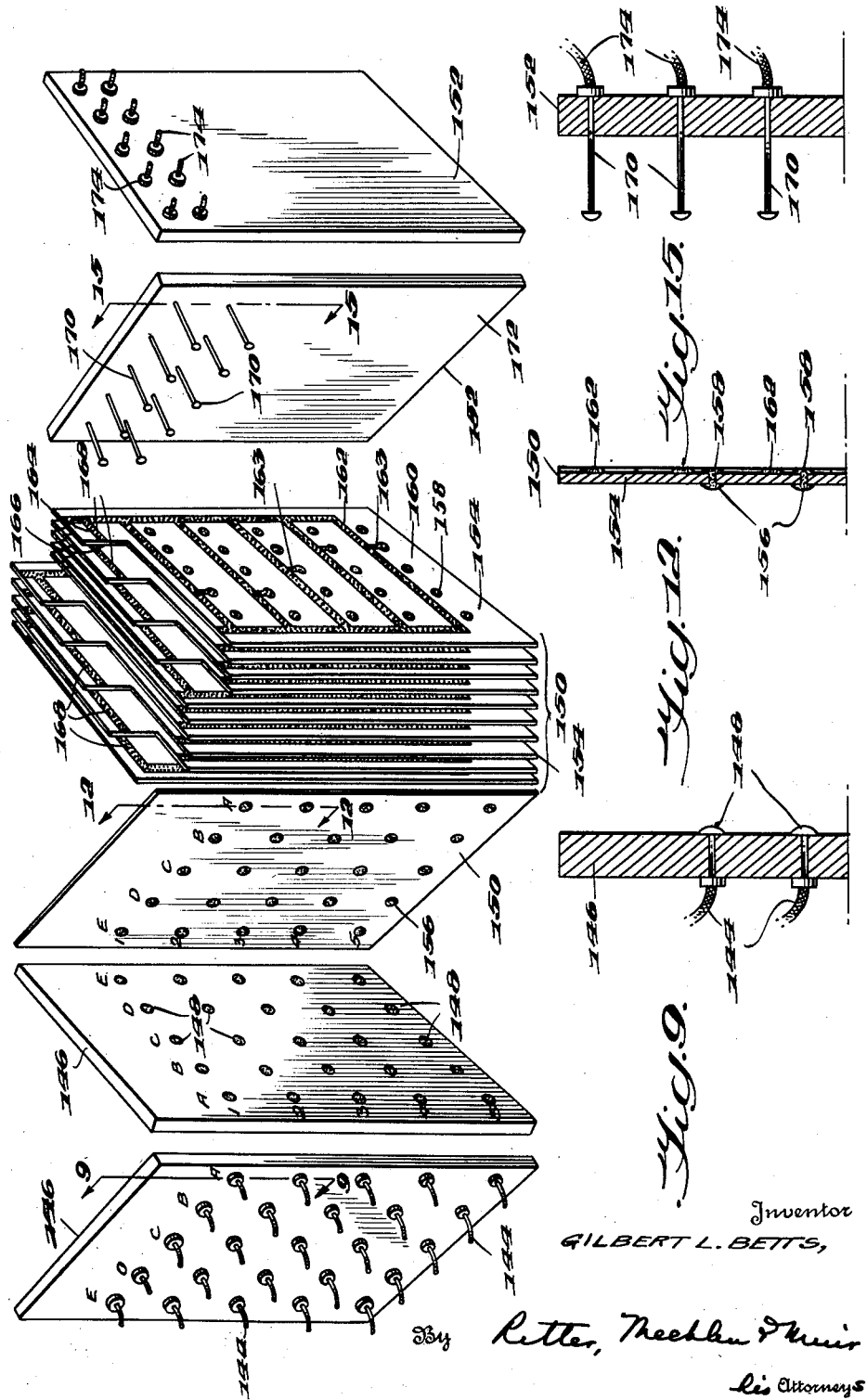
Inventor
GILBERT L. BETTS,
By Ritter, Meehlin & Muir
his Attorneys

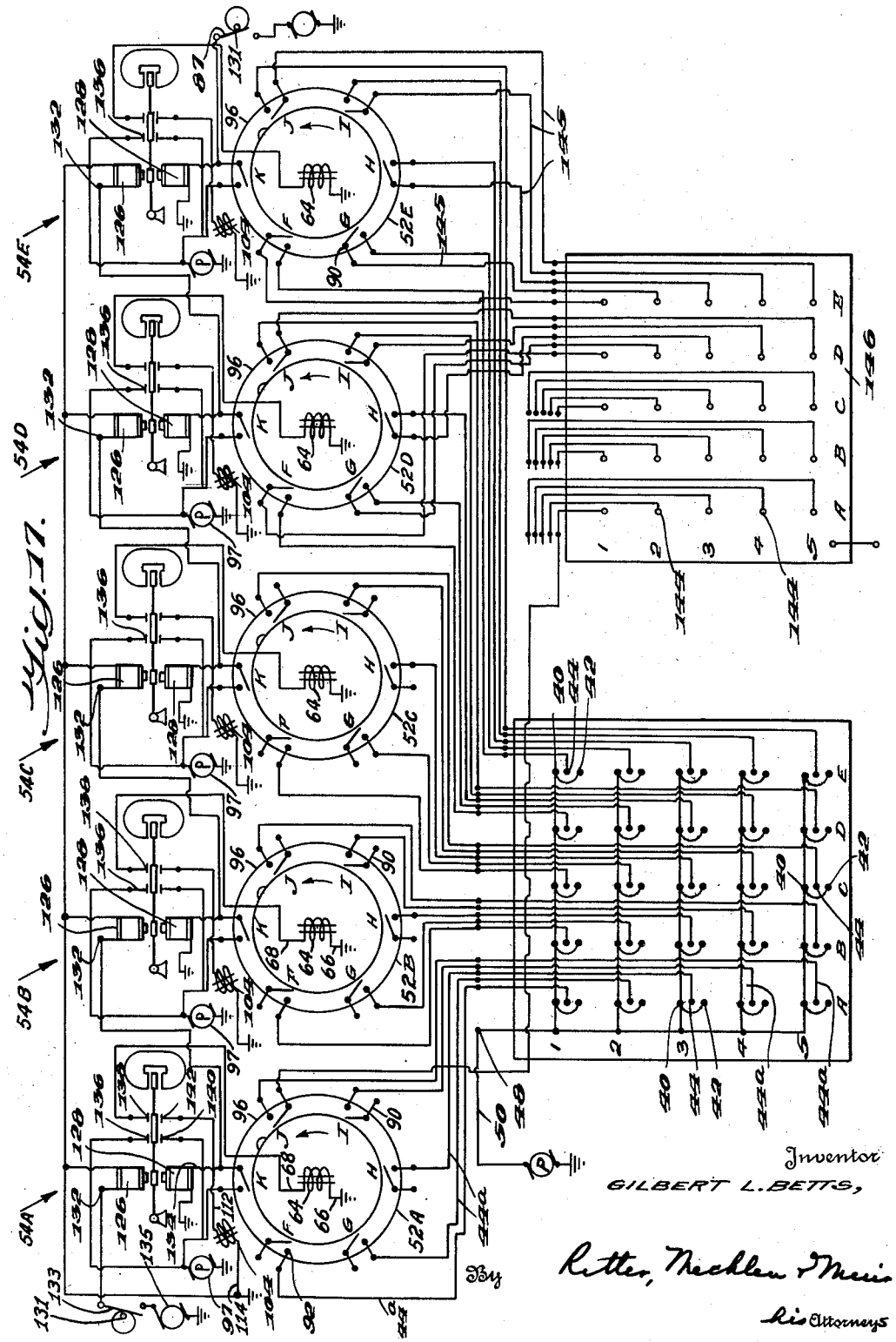

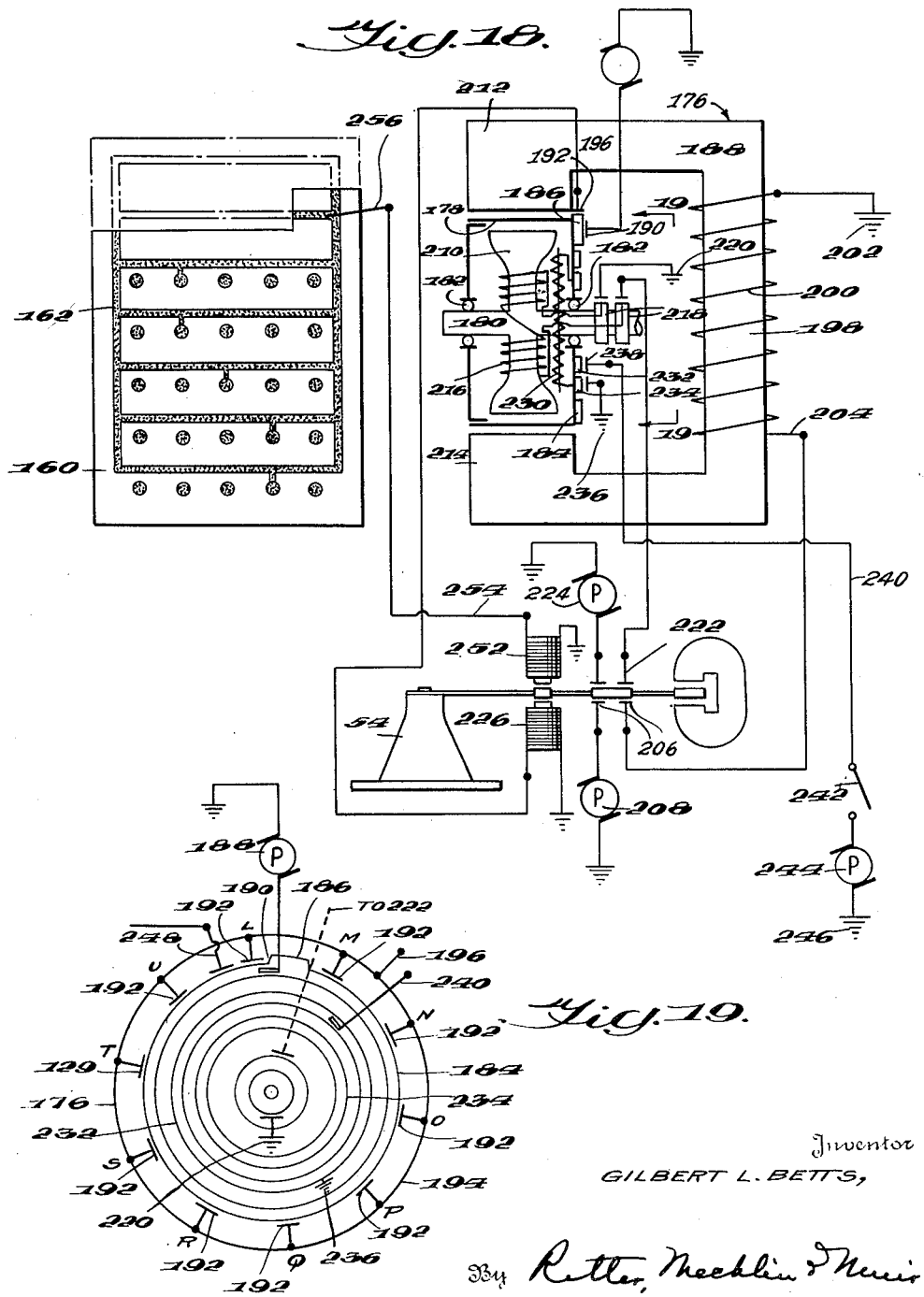

Patented May 27, 1952

2,598,155

UNITED STATES PATENT OFFICE 2,598,155

ELECTRIC DATA PROCESSOR

Gilbert L. Betts, Minneapolis, Minn.

Application March 26, 1946, Serial No. 657,164

8 Claims. (Cl. 235—61.6)

This invention relates to devices for selecting, classifying and summarizing data that have been recorded by markings in coded locations on data sheets.

An object of the invention is to provide a machine for selecting, classifying, and summarizing data that have been recorded in the form of markings in coded locations on data sheets which are automatically fed into the machine.

Another object of the invention is to provide a device for marking or grading examination papers on which answers are placed in the form of electrically conductive markings, and wherein the correct answers are automatically indicated on the machine in a convenient form such as a numerical total.

A further object of the invention is to provide a device for automatically scanning an answer sheet on which the answers are indicated by electrically conductive markings, and converting the correct answers into electrical impulses for actuating a counter to total the grade achieved by the examinee.

Another object of the invention is to provide a channeling device for use in an automatic machine for grading examination papers, by means of which electrical impulses derived from correct answers shown on the answer sheet may be led into various electrical channels according to the desires of the examiner for breaking down the number of correct answers by categories of questions.

Another object of the invention is to provide a device for grading examination papers with answers in electrically conductive marks in coded locations whereby the columns of markings may be scanned one by one, two by two, all at once, or in any other manner desired by the examiner.

A further object of the invention is to provide a machine for automatically grading examination papers having answers made with electrically conductive markings, which machine is automatic in operation, and capable of grading papers at a high rate of speed.

Other objects and advantages of the invention will become apparent from the following description of a preferred embodiment of my improved data processor as illustrated in the accompanying drawings, and in which Figure 1 is a perspective face view of an examination paper bearing answers in the form of conductive markings, and ready for grading.

Figure 2 is a perspective back view of a scanning plate.

Figure 3 is a perspective front view of the scanning plate shown in Figure 2.

Figure 4 is a sectional view taken on line 4—4 of Figure 2.

Figure 8 is a perspective view of the input face of the selector unit input plate showing the input poles.

Figure 9 is a sectional view taken on line 9—9 of Figure 8.

Figure 10 is a perspective view of the output side of the selector unit input plate shown in Figure 8.

Figure 11 is a perspective view of the input side of a channelizing grid plate.

Figure 12 is a sectional view taken on line 12—12 of Figure 11.

Figure 13 is a perspective view of a plurality of stacked channelizing grid plates showing the output face thereof.

Figure 14 is a perspective view of the input side of the output plate.

Figure 15 is a sectional view taken on line 15—15 of Figure 14.

Figure 16 is a perspective view of the output side of the output plate.

Figure 17 is a schematic assembled view showing the connections of the scanning plate, distributor sections, distributor control relays, and input plate.

Figure 18 is a schematic view showing a counter, relay and connections to a channelizing grid.

Figure 19 is a schematic view taken on line 19—19 of Figure 18.

Figure 5:
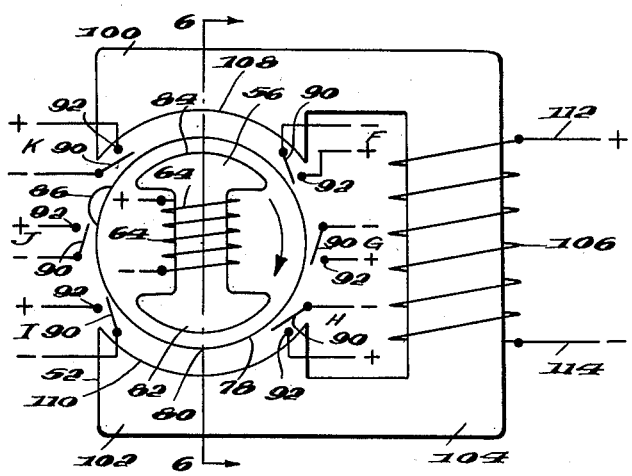
Figure 5 is a schematic view of a distributor section.

Basically, the invention comprises a data processor for selecting, classifying, and summarizing data that have been recorded in the form of electrically conductive markings in coded locations on data sheets. In its most extended form it does this without the necessity of re-runs, regardless of the number of categories, the number of data sheets, or nature of the summarizing formula involved in the data processing, and it does this without the necessity of any intermediate processing of the data sheets. Adaptations permit separate summarizing of data recorded in each location on the data sheet and segregation of data sheets having data recorded upon them in any predetermined pattern. This data processor is useful in a great variety of ways such as in making summary tables such as are published in the United States census, in processing data incidental to the construction and mass scoring of psychological tests, and in matching the detailed qualifications of a prospective employee with equally detailed job specifications.

In grading and the interpretation of the results of tests, it is common practice to have the student or other type of examinee record his answers to the questions on one or both sides of an answer sheet, which is then processed either by hand or by machine to determine the result of the test. In many tests, such as those given to thousands of soldiers or sailors, and examinations for civil service positions, it is necessary for the examination papers to be graded with great rapidity and with a high degree of accuracy.

The device described herein has particular utility in connection with examination papers in which the examinee indicates his choice of correct answers by making marks on the answer sheet with an electrically conductive material comprising the lead in a special type of lead pencil well known in the art. The questions are numbered on the question sheet, and the answer sheet bears corresponding numbers in vertical columns, with a plurality of small oblong boxes, usually five per questions, arranged horizontally next to each answer number. There may be, for example, one hundred fifty numbered answers on each side of the answer sheet, each answer number having five small answer boxes next to it, or a total of 750 answer boxes on each side of the sheet. These boxes may be arranged in 25 vertical columns of 30 horizontal rows. Other types of answer sheets may have a varying number of columns and rows, and may provide for a non-uniform number of answer choices per question and for non-uniform weighting of the correct answers. Thus, in scoring the test, the result may be simply the total number of correct answers, or some other figure as modified by non-uniform weighting and number of choices of answer per question. In addition, the examiner may desire the test to be scored by categories or groups of questions, arranged in some manner suitable for the purpose of the test. In most cases, however, the usual practice is to have the examinee fill in with electrically conductive material such as conductive lead in a lead pencil, as is well known in the art, the answer box next to each answer number corresponding to his choice of correct answer to that question.

Such an answer sheet 20 is shown in Figure 1. For the sake of simplicity of illustration and explanation, the answer sheet 20 has been shown with provision for answers to only five questions, each question having a choice of five possible answers, so that the answer sheet has a total of 25 markable locations thereon. It is to be understood, as mentioned above, that answer sheets having as many as 750 or more markable locations are in use, and that, as will be more fully explained, such answer sheets merely involve a multiplication of the elements in the data processor for handling them.

Referring to Figure 1, the answer sheet 20 which is generally made of paper or other suitable material and is substantially non-conductive to electricity, has imprinted in non-conductive ink on a face 22 thereof, five horizontal rows of oblong answer boxes 24, the boxes in each row being spaced as shown to form vertical columns. Along the left margin 26 of the answer sheet 20 is printed a vertical column of numbers 1, 2, 3, 4, and 5, indicating the number of the questions to which that row pertains, and along the upper margin 28 of the answer sheet is printed a horizontal column of letters A, B, C, D, and E, indicating the five choices of answer for the particular question. On the answer sheet shown, the person being tested, has filled in with electrically conductive lead, the answer boxes identified by coordinates as boxes 1A, 2B, 3C, 4D, and 5E, these being, in his opinion the correct answers to questions 1, 2, 3, 4, and 5, respectively. Since the answer boxes 24 are intended to be marked, by means of conductive lead, the boxes may also be termed markable locations on the answer sheet 20. According to the invention, it is intended that means be provided whereby each correctly marked box 24 will, when properly channeled and otherwise processed in the device, permit an electrical impulse to be transmitted in the device for actuating an indicating device such as a counter, and each incorrectly marked box 24 will not contribute toward actuating the indicating device.

To carry forward this purpose, a scanning plate 30 is shown in Figures 2, 3, and 4. This plate, which is designed to match the answer sheet 20, is formed preferably of a sheet of insulating material having twenty-five groups 34 of metallic contact members or bars extending through the sheet 32 from its back face 36 to its front face 38, the ends of the bars 35 protruding slightly out of the front and back faces of the sheet 30 to form contact points. Each bar 35, as seen in cross section, is slightly wider and slightly shorter than the area outlined on the answer sheet 20 as a markable location or answer box 24. Each of the two outside bars 40 and 42 in each group 34 is separated from the inside bar 44 by insulating material approximately 0.025 inch thick, which may be the material comprising the scanning plate 30 if the bars of each group are set into corresponding rectangular apertures in the sheet.

The twenty-five groups 34 of contact bars are arranged as shown, in five horizontal rows and five vertical columns, with the rows 1, 2, 3, 4, and 5, and columns A, B, C, D, and E in the same coordinate locations dimensionally as the markable boxes 24 on the face of the answer sheet 20, so that each group 34 of contact bars on the scanning plate lies across and in contact with the corresponding markable box 24 on the answer sheet 20 when the markable face 22 of the answer sheet is placed against the back face 36 of the scanning plate. When the answer sheet and scanning plate are thus placed in juxtaposition, the contact group 34 located at 1A on the back face of the scanning plate will press against markable marked location 1A on the answer sheet, and similarly with the rest of the juxtaposed contact groups and markable locations.

As shown in Figure 17, the two outside contact bars 40 and 42 in each group are electrically connected together and are of a different polarity from the inner bars 44 in each group, the connected outside bars 40 and 42 being positive and termed input poles, and the inside bars 44 being negative and termed output poles of the scanning plate. All the positive input poles 40 and 42 of all the groups 34 are electrically connected together by wires leading to a common terminal 48 connected in turn to a source of electrical power 50.

In scanning, each group 34 of three contact points 40, 42, and 44, is thus pressed against a corresponding markable location on the answer sheet. When such a location contains a conductive pencil mark, and when the remainder of the circuit is closed, an electrical impulse is conducted from a source of power 50 into the two input poles 40 and 42, through the pencil mark conductively bridging across them, and out through the outpole 44 in the same contact group 34. In case no pencil mark is present in a markable location 24, no current can flow through the output pole 44. In the illustration in Figures 1 to 4, inclusive, electrical impulses could flow from output poles located at 1A, 2B, 3C, 4D, and 5E on the scanning plate because conductive pencil marks are in these corresponding locations on the answer sheet, provided that the rest of the circuit, as described below, is so connected and arranged as to present a complete electrical path through which the impulses may flow. The scanning plates may be used singly, in multiples of four, or of any intermediate number.

In the case of an answer sheet both sides of which have markable locations, the answer sheet is pressed between two scanning plates, depending upon the size of the answer sheet, or between two or more pairs of scanning plates. The face of each scanning plate must be precision ground or otherwise formed with a tolerance small enough to be taken up within the thickness of the sheet of paper. If desired, the scanning plate may be made of conductive material such as metal, and have the contact groups 34 set into it, in the proper form and arrangement, and insulated from it and from each other. When this is done, and the scanning plate is mounted on a press, it must be insulated from the press. A platen press and Davidson feeder are contemplated as suitable for holding the scanning plates and for feeding answer sheets to the scanning plates, although other mechanical devices for performing the same functions may be employed if desired.

Figure 6:
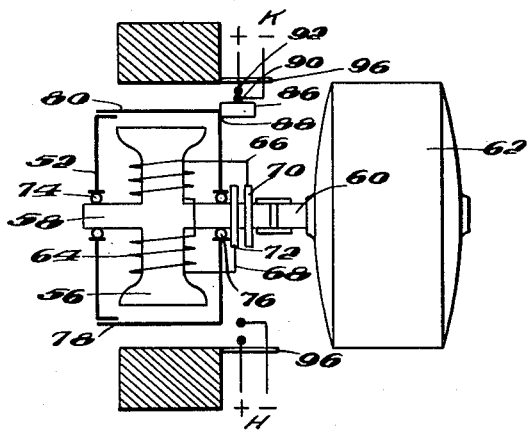
Figure 6 is a view, partly sectioned, taken on line 6—6 of Figure 5 and indicating the driving motor.

As shown in Figure 17, the data processor includes a distributor consisting of five duplicate distributor sections 52 for distributing electrical impulses from the scanning plate to the selector unit to be shown below. A single distributor section 52 is shown in Figures 5 and 6, there being one section 52 for each vertical column of markable locations on the answer sheet. If, for example, there were 25 vertical columns, then the distributor would include 25 duplicate distributor sections.

Figure 7:
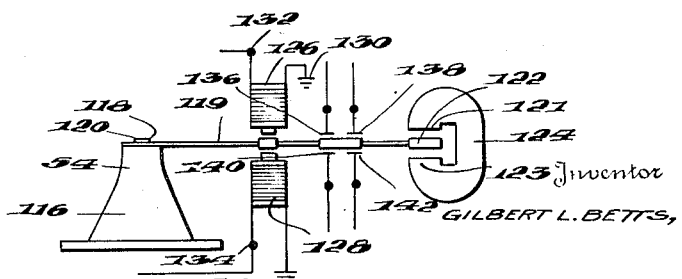
Figure 7 is a schematic side elevation of a distributor control relay.

A relay 54 for controlling the action of each distributor section is illustrated in Figure 7, there being one relay 54 for each distributor section 52. The function of the distributor is to close the separate circuits between each of the output poles on the scanning plate and the corresponding input poles on the selector unit (also called the channelizer), in the manner desired. The desired manner may vary from one to the other of the following, depending upon the arrangement of the markable locations on the answer sheet, which in turn is arranged so as to receive the data to be recorded on it. It may be desired in one case to close each of the circuits in turn, consecutively, e. g. 1A, 2A, 3A, etc., then 1B, 2B, 3B, etc., then 1C, 2C, 3C, etc., until scanning of the markable locations has been completed. In another case it may be desired to close part of them two at a time and part of them three at a time, e. g., 1A and 1B, 2A and 2B, 3A and 3B, and so on, to the bottom of the page, then 1C, 1D, and 1E; 2C, 2D, and 2E; 3C, 3D, and 3E; and so on to the bottom of the page, continuing in this manner until scanning of markable locations is completed. In another case it may be desired to omit scanning of a whole column, e. g. scanning columns A and B first, then omitting column C and scanning columns D and E next; and still again it may be desired to scan all columns simultaneously. Finally it may be desired to scan by some combination of the above procedures.

A distributor section 52, as best seen in Figures 5 and 6, has a rotating electromagnet 56 mounted on and keyed to a continuously rotating shaft 58 coaxially secured to and carried on the rotating drive shaft 60 of an electric motor 62, the magnetizing winding 64 of the electromagnet 56 having its end lead wires 66 and 68 brought out to negative and positive slip rings 70 and 72 carried on and keyed to shaft 58, but insulated therefrom. Also mounted coaxially on the shaft 58, but through anti-friction bearings 74 and 76 at each end, is a hollow cylindrical rotor drum 78 the cylindrical wall 80 of which is made of soft iron or some alloy having similar suitable magnetic characteristics, one of these being that it will not remain magnetized after removal of a magnetizing influence from proximity thereto. The turning electromagnet 56 rotates inside the rotor drum 78 with the pole faces 82 and 84 of the magnet 56 but slightly separated from the inner surfaces of the cylindrical wall 80 of the rotor drum 78, so that when current flows in the magnetizing coil 64 the soft iron rotor drum 80 will be magnetically attracted and seized by the magnetized pole faces 82 and 84 the result being that the rotor drum 80 will rotate in synchronism with the electromagnet 56.

A wiper cam 86 is mounted firmly on one edge 88 of the periphery of the rotor drum 80, extending therefrom in an axial direction as shown in Figure 6, so that as the rotor drum rotates, the cam 86 rotating therewith cams the spring mounted contacts 90 radially outward into electrical contact with the contacts 92 in each pair of six pairs of contacts F, G, H, I, J and K mounted on a stationary ring 96 carried on the sides of the poles 100 and 102 of stationary stopping electromagnet 104 which has magnetizing winding 106 wound around its core. The pole faces 108 and 110 of the stopping electromagnet 104 are only slightly separated from the outer cylindrical surface of the rotor drum 78. The energizing coil 106 of the stopping magnet 104 has its ends terminating in leads 112 and 114.

There is one such distributor section 52 for each vertical column of markable locations on the answer sheet or on the scanning plate, and suitable mechanical arrangements are made, such as by mounting all the distributor sections on a common shaft driven by a single motor and installing individual clutches and brakes, that if desired, any number of rotor drums may rotate simultaneously as a group in synchronism so that when the first group has made one revolution and stopped, the second group similarly makes one revolution and stops, and so on until all groups in turn have made one revolution and thus completed scanning the answer sheet. There is one such distributor section for each vertical column of markable locations on the answer sheet or on the scanning plate, and the arrangement is such that all sections may operate either simultaneously or in turn as desired.

The pairs of contacts 90—92 designated F, G, H, I and J, which are disposed around the support ring 96, respectively correspond to the five groups 34 of contact bars in each of the vertical columns A, B, C, D and E on the scanning plate, with the inside contact bar 44 in each group 34 being electrically connected to the plus contact terminal 92 in each corresponding pair of contacts on support ring 96 in the distributor section 52, as shown best in Figure 17. The sixth pair of contacts, designated as K on support ring 96 is similar in construction to the other contacts, and is similarly adapted to be closed by the camming action of cam wiper 86, but has a different purpose as will be further explained below.

Although the turning and stopping electromagnets are shown as bipolar, it is to be understood that this is merely illustrative, and that a greater number of poles in each may be used if considered desirable. When the turning electromagnets 56 are energized, the rotor 80 is seized thereby and rotates in synchronism therewith, in the direction of the arrow, and the wiper cam 86 moves past each of the pairs of contacts in turn and camming each movable contact 90 into electrical contact with contact 92. When the turning magnet 56 is de-energized, and the stopping magnet 104 is energized, the poles of the latter seize the rotor drum 80 and cause it to stop rotating.

This stopping and starting of the rotor drum 80 is controlled by distributor section control relays 54, shown by itself in Figure 7, and shown assembled with other parts of the mechanism in Figure 17. As shown in Figure 7, the relay 54 has a stationary support 116 to which one end 118 of a vibrator blade 119 is fastened by any suitable means such as a screw 120. The opposite end 122 of the blade 119 extends between the poles 121 and 123 of a permanent magnet 124. Intermediate the ends of the vibrator blade 119 and on opposite sides thereof as shown, are electromagnets 126 and 128, each having one end of its energizing coil connected to ground 130, and the other ends 132 and 134 of the respective energizing coils being connected in a manner to be explained.

A pair of electrical contacts 136 and 138 are disposed above and near the blade 119 intermediate its free end 122 and the electromagnets 126 and 128, and a similar pair of electrical contacts 140 and 142 are disposed below contacts 136 and 138 and below the blade 119 as shown. When upper electromagnet 126 is energized, it draws blade 119 upwards closing the circuit between upper contacts 136 and 138, the permanent magnet 124 holding the blade 119 upward against the said contacts. When upper electromagnet 126 is de-energized and lower electromagnet 128 is energized, then the blade 119 is drawn downwards closing the circuit between lower contacts 140 and 142, the permanent magnet 124 also functioning to hold the blade in this position. The connections of the distributor section control relays 54 to the rest of the circuit will be explained below after the selector unit has been described, by reference to the composite view in Figure 17.

The selector unit, also termed an electrical impulse channelizer, is illustrated in Figures 8 through 16, inclusive. The input poles 144, arranged in five vertical columns with five poles per column, extend through the input end plate 146 terminating in corresponding contact points 148 on the other surface of the plate 146. The number and arrangement of these contact points 144 and 148 corresponds to the number and arrangement of the output poles on the scanning plate, the plate 146 being formed of a sheet of insulating material. Ten scanning grids 150 shown in Figure 13, are interposed between input end plate 146 and output end plate 152.

The selector or scanning grids 150 consist of thin sheets 154 of insulating material, such as a sheet of paper, holding input and output contact points 156 and 158 respectively of conductive material corresponding in number and arrangement to the contact points 148 on the input plate 146. The conductive material composing these contact points on the selector grids 150 extends through the thickness of the grid, from one surface to the other, so that as the grids are stacked one on top of the other, or one next to the other, as shown in Figure 13, current may be fed from the first to the last grid 150 through each individual juxtaposed series of corresponding contacts 156 and 158, so that there are twenty-five individual electrical paths extending perpendicularly through the stack of selector grids. When grids are properly placed or stacked one against another and pressed against the output surface of the end plate 146, an electrical impulse at any input pole 144 such as located at 1A, will be conducted through all of the grids to the corresponding output point of the last grid 160 to the extreme right of Figure 13, namely, the output pole 158 located at 1A. Conductive material 162 is arranged in a grid pattern on the output surface of each grid as shown on the last grid 160 in Figure 13, to constitute a grid ground with parallel interconnected lines of the grid pattern passing near each output pole 158 so that only a small gap prevents current from flowing from one or more poles 158 to the grid pattern, and so that closing any such gap with additional conductive material as at 163 will enable current to be led from that pole 158 to the grid pattern 162 and thence to the output portion 164 thereof. It has been found that an aqueous suspension of colloidal graphite, "Carbon X," or "Aquadag" satisfactorily constitute the conductive material 162, and it is preferable that it be applied to the grid sheets by means of a printing press. The contacts such as 156 and 158 may be of the same material as 162 and also applied with a printing press, the material of the contacts being extended from one surface of the grid sheets to the other through small perforations in the sheets. The closing of the gaps, as indicated at 163, can be closed manually with a pen or small brush.

Each impulse to be channeled is thus led to a separate point on a channelizing grid sheet containing conductive material constituting a grid pattern or grid insulated from each input point by a closing gap. The grid leads into a particular channel. Thus an impulse arriving at any input point may be conducted into this channel by closing the gap between the input point and the grid with conductive material as already explained. A separate grid sheet is used for each channel, and the number of channels and corresponding grids is indefinitely large. By the arrangement shown, any impulse entering the input plate 146, may be conducted into any channel or any number of selected channels.

An alternative method of forming the grid sheets is to expose large sheets of photographic film to proper patterns of light and to utilize the silver emulsion as conductive material. Such film would need to be perforated before the light-sensitive emulsion is applied, and it would need such emulsion on the reverse side at the contact points. Having some such grid would permit a library of pre-assembled grid units to be accumulated rather inexpensively for reuse as repeat order jobs are received.

As shown in Figure 13, the ground 162 for each grid extends along one or more edges of the grid so that any point 164 near the edge may be used as the output point for that grid. When grids are added, the corresponding upper edge portion on each added grid is cut away as at 166, to expose the upper line 168 on the underlying grids so that contact projections 170 on face 172 of the output plate 152 may each bear against the exposed upper contact line portions such as 168. The output plate 152 is provided with ten such contact projections 170 arranged into horizontal rows of five each as shown, one for each channelizing grid, and the contact projections 170 extend through the output plate to its other surface where they form output poles 174.

In Figure 13, the last grid 160 at the extreme right of the view has the gaps closed conductively between the conductive grid pattern 162 and output points 1B, 2B, 3C, 4D and 5D. The gap closings are of conductive material similar to that of grid surface 162, through which an impulse arriving at a given output point such as 1B, may be led to the grid surface 162 and into the channel served by that particular grid. Each grid is prepared by closing such of the gaps as may be desired before the grids are assembled in the channelizer for use. For example, the right hand grid 160 in Figure 13 is thus prepared to conduct impulses in 1B, 2B, 3C, 4D, and 5D into the tenth grid channel should corresponding conductive pencil marks appear on the answer sheet. As shown in Figure 1, however, the answer sheet is not exactly so marked. From this particular answer sheet, impulses 2B, 3C, and 4D only would be led into the tenth grid channel on the right of Figure 13. Although Figure 13 shows the use of ten channelizing grids, it is to be understood that more or less grids may be used.

Referring now to Figure 17, there are illustrated the connections for the scanning plate, five distributor sections 52, five distributor section control relays 54, and the input plate 146 of the selector unit. As shown, the five inner contact points 44 in vertical column A of the scanning plate are connected by wires 44a to the corresponding positive contacts 92 of the pairs of contacts designated F, G, H, I and J on the ring 96 on the left hand distributor section 52A. The negative contacts 90 in each pair of contacts F, G, H, I and J on the ring 96, are connected to the corresponding five input poles 144 in vertical column A in selector unit input plate 146, by five wires 145. The K pair of contacts on the ring 96 has its positive contact connected to a source of power 97 and its negative contact connected to a terminal of electromagnet 128 in the left hand control relay 54A, the negative contact also being connected to terminal 132 of the second relay 54B from the left of the view as shown. Contact 136 of the relay 54 is connected to the source of power 97, and contact 138 is connected to the positive terminal 68 of the turning magnet, the negative terminal 66 of which is grounded. Contact 140 is connected to the source of power 97 while contact 142 is connected to one terminal 112 of the stopping magnet, the negative terminal 114 of which is grounded.

Terminal 132 of the magnet 126 of one of the relay units is connected to a suitably constructed pulsing switch 133. As shown the negative contact of the K pair on the rings 96 of each distributor section are connected to the magnet terminal 132 of the next relay 54. The same negative contact of the K pair in the extreme right hand distributor section 52 is connected to a starting relay 87 for actuating the press feeding mechanism in any manner well known in the art. The pulsing switch 133 has its other terminal connected to a source of power 135, the other terminal of which is grounded, and it is designed for closing momentarily when the scanning press is closed and ready for distributor action, thus permitting energizing current to flow in upper electromagnet coil 126 in left hand relay 54A of Figure 17.

Relay and counter assemblies are made up of single units, one of which is illustrated in Figures 18 and 19. A single digit counter 176 is similar in principle to a distributor section 52, already described, and, as herein illustrated, employs the same relay 54. The soft iron rotor drum 178 of the counter is rotatably supported on continuously driven rotating shaft 180 on anti-friction bearings 182, and carries an input 184 of conductive material upon which a wiper cam 186 is mounted, the arrangement being such that current from a source of power 188 is led through a brush 190 into the input ring 184 and its wiper cam 186. The wiper cam 186, as it is carried around by the rotating drum 178, contacts ten output brushes 192 shown best in Figure 19 and marked L, M, N, O, P, Q, R, S, T and U, the wiper contacting the brushes one at a time. The output brushes 192 are spaced at 36 degree intervals, are interconnected by wire 194, and have a common brush output pole 196. In the counter, the stopping electromagnet 198 is bipolar, with energizing coil 200 grounded at one end 202 and having its other end 204 leading to one of a pair of contacts 206 in the relay, the other of the pair of contacts being connected to a source of power 208. Similar to the construction of the distributor sections 52, the rotor drum 178 is in close proximity to both the outer pole faces of the rotating turning electromagnet 210 and to the inner pole faces 212 and 214 of the stopping electromagnet 198. The energizing coil 216 of the turning electromagnet 210 has its leads connected to slip rings 218 with brushes bearing thereon and one brush grounded at 220, while the other is connected to one of a pair of upper contacts 222 of the relay, the other of the pair of contacts being connected to a source of power 224. The brush output pole 196 is connected to one end of the energizing coil of lower electromagnet 226 in the relay while the other end of the coil is grounded.

Inside the rotor drum 178, and fastened to the right hand flat end wall of the drum for rotation therewith, is a resetting electromagnet 230 with its poles near the cylindrical walls of the drum. The energizing coil of the magnet 230 is connected by means of slip rings 232 and 234 to brushes, one of which is grounded at 236, the other brush 238 being connected by wire 240 to one terminal of a switch 242, the other terminal of which is connected to a source of power 244, which in turn has one terminal grounded at 246. When it is desired to reset the counter, a closing of the switch 242 leads current through the resetting magnet 230 and polarizes its core. This is done while current is flowing through the coil 200 of the stopping magnet 198, which is also polarized. By maintaining the proper polarity in each of these magnets, closing switch 242 will cause resetting magnet 230 to swing like the needle of a compass and reset the rotor drum 178 to the zero position. As illustrated in Figure 18, switch 242 is manually operated, but automatic operation may also be provided if desired.

A window (not shown) in the housing of the rotor drum 178 permits the letters L to U, inclusive, on the periphery of the drum to be seen as they are turned up. Another such single digit counter can be connected so that the two together can turn up a two digit number. This is accomplished by means of a second output pole brush 248 at the side of the brush 192 designated L, so that the wiper cam 186 contacts both simultaneously. The impulse from brush 248 is led to the electromagnet coil in the relay of the tens counter corresponding to the electromagnet coil 252 in the relay of the single digit counter shown in Figure 18. Any number of additional counters can be added similarly, one to another, so that a figure with any number of digits can be turned up. As shown in Figure 18, the ungrounded lead of electromagnet 252 in the relay is connected by wire 254 to end plate output pole 256 shown also in Figure 18 of the selector unit, which in turn leads to contact with channelizing grid 162 on the extreme right hand grid sheet 160 shown in Figure 13. Pole 256 of Figure 18 corresponds to pole 170 in Figure 14.

As shown in Figure 17, the pulsing switch 133, which includes a contact maker connected to a source of power 135, has its operating shaft 131 common to and connected with the press feeder control relay 87.

Summary of operation

The operation of the data processor can be best explained with reference to Figure 17. The scanning plate is pressed against the face of an answer sheet so that the contact points on its back (Figure 2) rest upon corresponding markable locations on the front of the answer sheet, Figure 1. All input poles on the front of the scanning plate are interconnected, and receive current from a source of power 50. Scanning plate output pole 1A is connected with input pole 92 (positive F) in the first distributor section to the left of Figure 17; scanner output pole 2A is connected with positive input pole G in the same distributor section, and so on with the last scanner output pole 5A connected to positive input pole J in the same left hand distributor section. Output pole number F (negative) in the extreme right hand distributor section 52E in Figure 17 is connected to input pole 1E on the selector unit (channelizer), distributor output pole negative G in the same right hand distributor section is connected with selector input pole 2E and so on to the last. Output poles on the first, second, third and fourth distributor sections from the left of the figure, correspond to and are similarly connected with input poles in columns A, B, C, and D of the selector unit. Electromagnet 126 in the relay at the left of Figure 17 is connected to a pulsing switch 133 that closes momentarily when the scanning press holding the scanning plate on the answer sheet is closed and ready for distributor action. This raises the vibrator blade 119 of the relay and closes the gap between the pair of input-output poles 136—138. The input pole 136 is connected with a source of power 97 and the output pole is connected with the input pole (positive) of the turning magnet 64 in the distributor section at the left of the figure. Raising the vibrator blade opens the gap between input-output poles 140—142 in the relay. The input pole 140 is connected with a source of power 97 and the output pole 142 is connected with the input pole (positive) of the stopping magnet 104 in the distributor section. Thus the turning magnet is activated and the stopping magnet is inactivated. The turning magnet grabs magnetically the barrel walls of the rotor drum and takes it through one revolution, the wiper closing the gaps between pairs of contacts F, G, H, I and J in turn and finally gap K on the distributor section. The positive input pole at gap K is connected with a source of power 97 and the output pole is connected with the relay pole 134.

This lowers the vibrator blade, opens the gap between contacts 136 and 138, and closes the gap between the contacts 140 and 142. The lower input pole 140 in the relay is connected with a source of power 97 and the output pole 142 is connected with the input pole of the stopping magnet 104. Thus the turning magnet 64 is inactivated, the stopping magnet is activated, and the rotation of the rotor drum is stopped. The output pole at contact pair K in the distributor section 52A at the left of Figure 17 is also connected with the 126 magnet in the next adjacent relay 54B so that stopping the action of the first distributor section also initiates similar cyclic action in the second distributor section.

This chain of action continues from one distributor section to another until each in turn has been activated. The output pole at contact pair K on the distributor section 52E at the right of Figure 17 is also connected with a relay 87 the other terminal of which is grounded, starting the action of the press feeder. During feeder action the counter dials are read and cleared. When the scanned answer sheet is removed from the press, a new one is inserted, the press closed, and the whole cycle is repeated.

By this procedure each column is scanned in turn. By disconnecting the pole 132 of the second relay from the output pole K of the first distributor section and connecting it with the pulsing switch 133, columns A and B may be scanned simultaneously. By making similar changes along the line of distributor sections, any number of columns (even all of them) may be scanned simultaneously. By disconnecting the pole 132 of the second relay 54B (reading from left to right) from the output pole K on the first distributor section and letting it hang, and by disconnecting the pole 132 of the third relay from the second distributor output pole K and connecting it to the first distributor section output pole K, the second distributor section is inactivated and the scanning of column B is omitted. By making similar changes along the line, the scanning of any column or group of columns can be omitted. By making use of these two types of circuit changes, scanning sequences can accommodate any coding arrangement provided in the answer sheet columns.

Assuming that five columns are scanned simultaneously and that in each item 1, 2, 3, 4, etc., a mark is placed in one column only (A, B, C, D or E), data processing would be as follows: In the answer sheet the A answer is marked for question (item) 1, the B answer for question 2, the C answer for question 3, the D answer for question 4, and the E answer for question 5. In the extreme right hand channeling grid sheet in- Figure 13, the correct answers are given as B to question 1, B to question 2, C to question 3, D to question 4, and D to question 5. The object of the scanning is to turn up on the counter the number of right answers contained on the answer sheet. Only one of the five answers given in the test for each question is the correct answer, so the examinee selects the one he thinks is right, that is, A, B, C, D, or E, and makes a conductive mark in the corresponding box and column on the answer sheet to indicate his choice.

When the answer sheet is placed in the press, the scanning plate rests upon it, with input-output contact points pressed against each markable location. Current can flow from a source of power to all input poles (positive) on the scanning plate, through the pencil mark at 1A, 2B, 3C, 4D, 5E, to the corresponding output poles on the scanning plate. As the rotor drums in the five distributor sections revolve, the wiper closes contact gap F in each section, A, B, C, D, and E. Since a pencil mark appears only in column A, current can flow through the gap in distributor section A only. The output pole negative F in the first distributor section is connected to input pole 1A on the selector unit or channelizer so current can flow to there, through the end plate to contact point 1A on its other surface, to input point 1A on the left hand channeling grid in Figures 11 and 13, and through all ten grids to the ground surface 162 of the last grid 154. But current cannot flow to the grid-ground through a mark at 1A because the right answer is marked on the grid sheet at 1B. Neither can current flow to the grid ground at 1B, because there is no pencil mark at 1B on the answer sheet.

Each of the five rotor drum wipers next close gap G on ring 96. The mark at 2B on the answer sheet allows current to flow to input pole 2B on the selector's input plate, through all ten channeling grids to the ground surface of grid 10. Here 2B is the correct answer and current flows through the mark to the grid ground, is picked up by lead 256 (Fig. 18), and is transmitted over wire 254 to relay magnet 252. This raises the vibrator blade, thus opening circuit 226 and de-energizing the stopping magnet 200 in the units counter. Raising the vibrator blade also closes circuit 222 and energizes the turning magnet in the counter permitting it to seize magnetically the rotor drum and turn it through 36°. It is stopped at this point by an impulse led from a source of power 188 into slip ring 184 and cam 186, into contact point 192 at L, thence into relay magnet 226. This depresses the vibrator blade, thus opening the circuit at 222 and de-energizing turning magnet 210. Depressing the vibrator blade also closes the circuit at 225 re-energizing the stopping magnet 188 which thus seizes magnetically the rotor drum 178 and stops it. The turning speed of the shaft 180 is so set that the above action of the counter is completed before cam 86 on the rotor drum of the distributor has reached the next gap H. Thus the numeral 1 has been turned up in the counter window.

Each of the five rotor drums in the distributor continues to revolve and closes the remaining gaps H, I and J in turn. Since both the answer sheet and right hand channeling grid 154 have pencil marks at 3C and 4D, current flows to the counter as gaps 3 and 4 in the distributor are closed, and two more units are turned up in the counter. In the case of question 5, however, answer E is marked on the answer sheet and D is marked on the channeling grid, so the counter is not activated. At the completion of scanning, the final number turned up on the counter will be 3, the number of right answers on the answer sheet.

Although I have described a preferred embodiment of my invention in specific terms, it is to be understood that various changes may be made in size, shape, materials and arrangement without departing from the spirit and scope of the invention as claimed.

What I claim is:

1. A device for selecting, classifying and summarizing data recorded by means of electrically conductive markings on data sheets, comprising sheet scanning means cooperatively connective simultaneously to all said markings, means cooperating with said scanning means for channeling selected categories of impulses derived from said markings into electrical paths selected by the operator, and counter means responsive selectively to individual impulses so channeled for summarizing the data represented by markings on said data sheets.

2. A device for totalizing selected conductive markings on data sheets, comprising scanning plate means cooperatively presentable simultaneously to all said markings on each of said data sheets, distributor means connected to said scanning plate means, channelizing grid means connected to said distributor means, and counter means connected to said channelizing grid means for totalizing consecutive individual impulses derived from said selected conductive markings on said data sheets.

3. A device for totalizing selected conductive markings on data sheets, comprising scanning plate means cooperatively presentable to said data sheets in simultaneous juxtaposition to all said markings, distributor means connected to said scanning plate means, channelizing grid means selectively connectable to said distributor means, and counter means connected to said channelizing grid means for totalizing consecutive individual impulses derived from said selected conductive markings on said data sheets.

4. A device for totalizing selected conductive markings on data sheets having markable locations, comprising scanning plate means including pairs of scanning contacts cooperatively presentable to said data sheets in simultaneous juxtaposition to all said markable locations, distributor means connected to said scanning plate means, channelizing grid means selectively connectable to said distributor means, and counter means connected to said channelizing grid means for totalizing consecutive individual electric impulses derived through circuits completed by said conductive markings on said data sheets.

5. A device for totalizing selected conductive markings on data sheets having markable locations, comprising scanning plate means including pairs of scanning contacts cooperatively presentable to said data sheets in simultaneous juxtaposition to all said markable locations, rotatable distributor means connected to said scanning plate means, channelizing grid means selectively connectable to said selected markings through said distributor means, and counter means selectively actuated by said channelizing grid means for totalizing consecutive individual electric impulses derived through powered circuits jointly completed by said conductive markings on said data sheets and by said channelizing grid means.

6. A device for totalizing selected conductive markings on data sheets having markable locations, comprising scanning plate means including pairs of scanning contact elements cooperatively presentable to said data sheets in simultaneous juxtaposition to all said markable locations, intermittently rotatable distributor means connected to said scanning plate means, channelizing grid means selectively connectable to said selected markings through said distributor means, and counter means selectively actuated by said channelizing grid means for totalizing consecutive individual impulses derived through powered circuits jointly completed by said conductive markings on said data sheets and by said channelizing grid means.

7. A device for totalizing selected conductive markings on data sheets having markable locations, comprising scanning plate means including pairs of scanning contacts all simultaneously cooperatively presentable to said data sheets with each pair of contacts in position for being conductively bridged by a conductive marking on said data sheets, intermittently rotatable distributor means connected to said scanning plate means, channelizing grid means selectively connectable to said selected markings through said distributor means, and intermittently rotatable counter means including relays, selectively actuated by said channelizing grid means for totalizing consecutive individual impulses derived through powered circuits jointly completed by said conductive markings on said data sheets and by said channelizing grid means.

8. In a device for totalizing selected conductive markings on data sheets having markable locations, channelizing grid means comprising an input plate having contact points arranged in columns and rows corresponding in number and location to the markable locations on said data sheets, a plurality of channelizing grid sheets each having conductive material extending through the sheet from face to face, contacts arranged similarly to those on said input plate so that upon stacking said grid sheets face to face and with the end sheet in contact with said input plate a plurality of individual parallel electrical paths are formed through all said corresponding contacts on said input plate and grid sheets, each grid sheet having on one face and spaced from its contact points a grid pattern formed of conductive material, whereby selected contacts on each grid sheet may be connected to its said grid by making a conductive marking on said sheet from said grid to each of said selected contacts, and output plate means constructed and arranged for furnishing a separate conductive path from each of said grid patterns to individual spaced contact points on said output plate.

GILBERT L. BETTS.

REFERENCES CITED

The following references are of record in the file of this patent:

UNITED STATES PATENTS

| Number | Name | Date |
|---|---|---|
| 1,987,322 | Campbell | Jan. 8, 1935 |
| 2,150,256 | Warren | Mar. 14, 1939 |
| 2,173,921 | Stansbury | Sept. 26, 1939 |
| 2,183,449 | Evans et al. | Dec. 12, 1939 |
| 2,275,590 | Johnson | Mar. 10, 1942 |
| 2,353,061 | Oldenboom | July 4, 1944 |